United States Patent
Feng et al.

(10) Patent No.: US 8,382,566 B2
(45) Date of Patent: Feb. 26, 2013

(54) NETWORK GAME ANTI-CHEATING DEVICE, METHOD AND SYSTEM

(75) Inventors: Bowen Feng, Shenzhen (CN); Kai Feng, Shenzhen (CN); Wei Gong, Shenzhen (CN); Jiajia Hu, Shenzhen (CN); Yonglin Zeng, Shenzhen (CN); Xuxin Wang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 793 days.

(21) Appl. No.: 12/395,245

(22) Filed: Feb. 27, 2009

(65) Prior Publication Data

US 2009/0163280 A1 Jun. 25, 2009

Related U.S. Application Data

(63) Continuation of application No. PCT/CN2007/070593, filed on Aug. 30, 2007.

(30) Foreign Application Priority Data

Sep. 4, 2006 (CN) .......................... 2006 1 0128632

(51) Int. Cl.
*A63F 9/24* (2006.01)
(52) U.S. Cl. .............................................. 463/1; 463/25
(58) Field of Classification Search ................ 463/1, 16, 463/25, 29, 42
See application file for complete search history.

(56) References Cited

U.S. PATENT DOCUMENTS

| | | | | |
|---|---|---|---|---|
| 4,592,546 A | * | 6/1986 | Fascenda et al. | 463/29 |
| 6,749,505 B1 | * | 6/2004 | Kunzle et al. | 463/30 |
| 8,052,526 B2 | * | 11/2011 | Abbott et al. | 463/29 |
| 2002/0042293 A1 | * | 4/2002 | Ubale et al. | 463/9 |
| 2003/0109306 A1 | * | 6/2003 | Karmarkar | 463/40 |
| 2003/0125103 A1 | * | 7/2003 | Tessmer et al. | 463/20 |
| 2003/0236110 A1 | * | 12/2003 | Beaulieu et al. | 463/1 |
| 2005/0040600 A1 | * | 2/2005 | Vilyamovich | 273/292 |
| 2006/0178185 A1 | * | 8/2006 | Weis | 463/13 |

FOREIGN PATENT DOCUMENTS

| | | | |
|---|---|---|---|
| CN | 1852139 A | * | 10/2006 |
| CN | 1852139 A | | 10/2006 |
| CN | 1862547 A | | 11/2006 |
| CN | 1940947 A | | 4/2007 |
| CN | 1940947 A | * | 4/2007 |

OTHER PUBLICATIONS

Jeff Yan, "Security Design in Online Games," acsac, pp. 286, 19th Annual Computer Security Applications Conference (ACSAC '03), 2003.*
International Search Report for Application No. PCT/CN2007/070593 dated Nov. 8, 2007.

* cited by examiner

*Primary Examiner* — Corbett B Coburn
*Assistant Examiner* — Robert Mosser
(74) *Attorney, Agent, or Firm* — Marshall, Gerstein & Borun LLP

(57) ABSTRACT

An embodiment of this invention discloses a network game anti-cheating device, method and system. The device includes: an information processing unit, adapted to modify actual game state information to dummy game state information, and send the dummy game state information to a terminal of a player; and a seat assignation unit, adapted to assign a player into an unoccupied seat of an idle table according to actual table information in a game room. The information processing unit comprises: a table information processing unit, adapted to send dummy table information in the game room to the terminal of the player; a watching information processing unit, adapted to send dummy game information of players who are playing the game on the table; and a partner-player information processing unit, adapted to send dummy information of the partner-players on the table.

10 Claims, 2 Drawing Sheets

NETWORK GAME ANTI-CHEATING DEVICE, METHOD AND SYSTEM

CROSS-REFERENCE TO RELATED APPLICATIONS

This is a continuation of International Application No. PCT/CN2007/070593, filed Aug. 30, 2007, which claims the priority benefit of Chinese Patent Application No. 200610128632.1, filed Sep. 4, 2006, the entire respective disclosures of which are incorporated herein by reference.

FIELD OF THE INVENTION

The present invention relates to computer network technologies, and particularly, to a network game anti-cheating device, method and system.

BACKGROUND OF THE INVENTION

Along with the development and popularization of the Internet, network games gradually become one of major applications of the Internet, and more and more Internet users play the network games.

A network game can be considered as a big game platform on which a lot of players are online. Network games include those ones supporting Instant Massaging (IM), and also include ordinary network games that do not have the IM feature. Existing IM network games mainly include MSN games and ICQ games, etc.

The existing network games include various mainstream games such as casual games, cyber games and entertainment games. When a player wants to play a game, the player needs to enter into a game room in a game hall first, find an appropriate seat in the game room, and then start a game with players on the same table. Generally, one room allows hundreds of users to play at the same time. Games mentioned in the present invention refer to games in which some players may cheat by knowing cards in other players' hand, such as Doudizhu, tuolaji, Chinese mahjong and Chinese chess games. The present invention is illustratively described by taking the casual game as an example.

Hereafter, taking an IM game for an example, the existing method for playing a casual game mainly includes the following steps:

Step one: A player runs game software, enters a corresponding game hall with an IM number, selects and enters into a game room providing a multi-player casual game.

Step two: A game server has correctly read table information in the game room when the player enters into the game room, and sends the table information to a terminal of the player, and displays actual information of all tables in the game room to the player. States of a table include whether the table is idle; and whether the table has an unoccupied seat if the table is idle.

Step three: The player selects a table which is idle and has an unoccupied seat with a "join the game" function provided by the game server or making a search himself, and occupies the seat of the table. The player also can select a table with all seats occupied and watch a game being played by other players on the table with a "watching" function provided by the game server.

Step four: After the player occupies the seat of the table, the game server provides the terminal of the player with information of other players on the same table. Such information can be used for effectively identifying the other players on the same table and includes IM numbers, nicknames, scores and levels, etc. When the number of the players on the same table is adequate for starting a game and all the players on the table select to start a game, a game starts.

In the existing network games, such as the multi-player casual game, the player can select a table and a seat of the table himself, and can obtain various information of partner-players on the same table. Therefore, it has a possibility for some players to cheat. Players cooperating to cheat can select the same table, know cards in one another's hand with the IM software or other communication manners, and then cheat. Additionally, since players can use the "watching" function, it provides a possibility for multiple players to cooperate to cheat and deceive other players, which makes the game lose its fair feature.

SUMMARY OF THE INVENTION

Embodiments of this invention provide a network game anti-cheating device, method and system, in order to guarantee the fair feature of the game.

A network game anti-cheating device provided in embodiments of this invention includes:

an information processing unit, adapted to modify actual game state information to dummy game state information, and send the dummy game state information to a terminal of a player; and a seat assignation unit, adapted to assign a player into an unoccupied seat of an idle table according to actual table information in a game room.

A network game anti-cheating method provided in embodiments of this invention includes:

modifying actual game state information to dummy game state information;

sending the dummy game state information to a terminal of a player; and assigning a player to an unoccupied seat of an idle table according to actual table information in a game room.

A network game anti-cheating system provided in embodiments of this invention includes: a terminal of a player, a game server and an anti-cheating device arranged between the terminal of the player and the game server, wherein the game server is adapted to provide actual game state information to the anti-cheating device;

the anti-cheating device is adapted to modify the actual game state information to dummy game state information, send the dummy game state information to the terminal of the player, and assign the player to an unoccupied seat of an idle table according to actual table information in a game room; and the player terminal is adapted to receive the dummy game state information.

In embodiments of the present invention, by using an anti-cheating device between the terminal of the player and the game server, it can be avoided that some players intently choose the same table to practice cheat, some players see one another's cards by using the IM software or other communication manners, and some players deceive other players by watching game information of the other players who are playing. Therefore, the fair feature of the game can be guaranteed.

DETAILED DESCRIPTION OF THE INVENTION

In embodiments of the present invention, an anti-cheating device is arranged between a game server and a terminal of a player. When the player selects to enter into an anti-cheating game room, the device is run, which can prevent, without affecting normal operations of the game server and normal procedure of the game, cheating practiced by some players by seeing cards in others' hands.

Hereinafter, embodiments of the present invention are described in detail by referring to accompany drawings.

The player needs to start game hall software first if the player wants to play a game. The player inputs his/her IM account number and password, logs in the game server, and then enters into the game hall. During the above processes, the game server has correctly obtained information of the player capable of effectively identifying the player. Such information includes an IM number, nickname, score and level of the player, etc. The game server then sends room information to the terminal of the player, and displays the room information in the game hall. The players may select and enter into a game room providing a multi-player casual game.

If the player enters into a game room providing ordinary games, the game server runs a procedure identical to the existing one. If the player selects to enter into an anti-cheating game room, the anti-cheating device starts to run.

Figure 1:
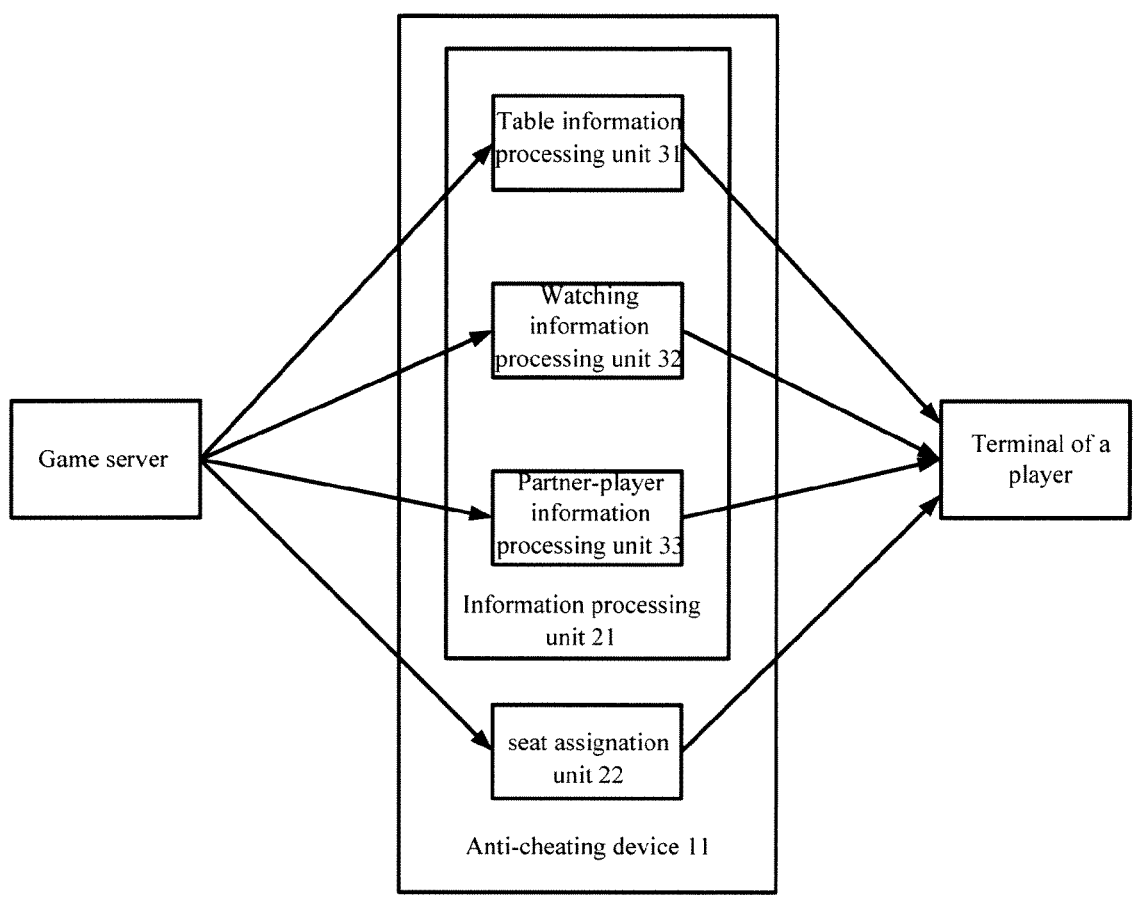
FIG. 1 shows a schematic diagram of an anti-cheating device according to an embodiment of the present invention.

As shown in FIG. 1, the anti-cheating device includes information processing unit 21 and seat assignation unit 22. Information processing unit 21 is used to send dummy game state information to the terminal of a player, and seat assignation unit 22 is used to assign the player to an unoccupied seat of an idle table according to actual table information in the game room.

In embodiments of the present invention, the game state information at least includes table information in the game room, and/or game information of players who are playing the game on a table, and/or information of partner-players on the table. The dummy game state information at least includes: dummy game state information formed by hiding all actual game state information, and/or dummy game state information formed by hiding a part of actual game state information, and/or dummy game state information formed by making all actual game state information invalid. In practice, the actual game state information is the game state information, and the dummy game state information is formed by hiding all or a part of the game state information, or making all the game state information invalid.

Information processing unit 21 further includes table information processing unit 31, watching information processing unit 32 and partner-player information processing unit 33. Table information processing unit 31 is used to send dummy table information in the game room to the terminal of the player. Watching information processing unit 32 is used to send to the terminal of the player dummy game information of players who are playing the game on the table. Partner-player information processing unit 33 is used to send to the terminal of the player the dummy information of partner-players who are playing the game on the same table.

In embodiments of the present invention, the table information at least includes information indicating whether the table is idle, and/or information indicating whether the idle table has an unoccupied seat.

Figure 2:
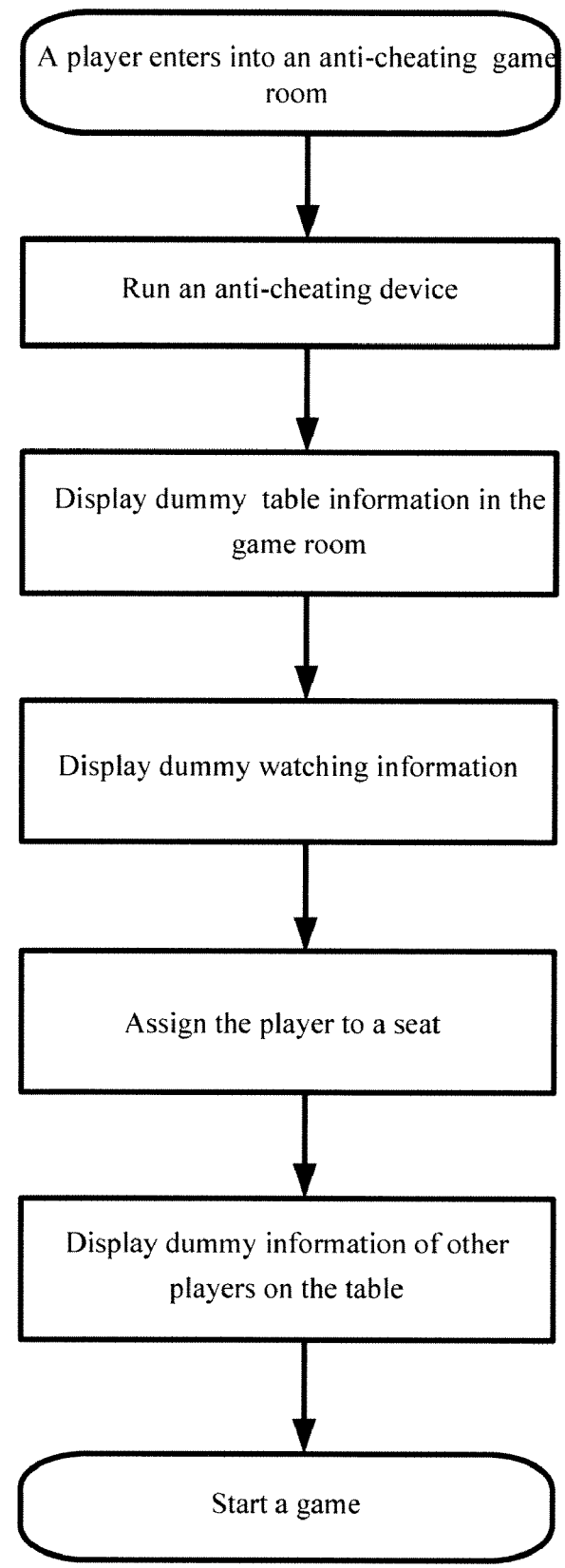
FIG. 2 is a flow chart illustrating a work flow of an anti-cheating device according to an embodiment of the present invention.

As shown in FIG. 2, the working mode of the anti-cheating device is as follows:

The game server has correctly read the actual table information in the game room when the player enters into the anti-cheating game room, and sends the actual table information to table information processing unit 31. Table information processing unit 31 modifies the received actual table information and sends corresponding dummy table information to the terminal of the player.

Table information processing unit 31 modifies the actual table information to obtain the corresponding dummy table information by the following processes:

(a) Table information processing unit 31 sends table information of all tables to the terminal of the player, but all the table information is invalid.

For example, when receiving information indicating whether the table is idle and information indicating whether the idle table has an unoccupied seat, table information processing unit 31 directly modifies this information to the dummy table information indicating that all the tables are occupied and all seats of each table are occupied, and then sends the dummy table information to the terminal of the player. Since a table is actually shown as a picture, a table with all seats occupied can be displayed by displaying a default head portrait on each seat.

(b) Table information processing unit 31 hides all the table information.

For example, table information processing unit 31 directly deletes all the received table information and does not send information to the terminal of the player.

(c) Table information processing unit 31 hides a part of the table information.

For example, table information processing unit 31 deletes information indicating whether the table is idle, and sends to the terminal of the player dummy information indicating that each seat of each table has been occupied.

When a player sends to the game server a watch game command, the game server immediately sends to the watching information processing unit 32 actual information of players on the table. Such actual information includes one or more pieces of the following game data information, such as information of cards in the players' hands, and information of cards distributed by the players on the table. Watching information processing unit 32 modifies the received actual information and sends the corresponding dummy information to the terminal of the player.

Watching information processing unit 32 modifies the watching information to obtain the dummy information by the following processes:

(a) Watching information processing unit 32 sends all the game information of the players on the table to the terminal of the player, but all the game information is invalid.

For example, when receiving the game information of the players, watching information processing unit 32 modifies the cards in the players' hands as default cards, and also modifies the cards distributed by the players on the table as default cards, and sends modified dummy game information of the players to the terminal of the player.

(b) Watching information processing unit 32 hides all the game information of the players on the table.

For example, watching information processing unit 32 directly deletes all the received game information of the players and does not send information to the terminal of the player.

(c) Watching information processing unit 32 hides a part of the game information of the players on the table.

For example, watching information processing unit 32 deletes information of the cards distributed by the players on the table, and modifies the cards in players' hands as default cards, and then sends such dummy information to the terminal of the player.

Since the player can not obtain the actual table information according to the information displayed on the terminal of the player, the player has to sends a join game command to the game server if the player wants to enter into the table and start a game. When the game server receives the join game command from the player, the game server immediately sends to the seat assignation unit 22 the actual table information in the anti-cheating game room. Seat assignation unit 22 assigns the player to an unoccupied seat according to information of the actual idle table and unoccupied seats thereof, sends to the terminal of the player the number of players on the table, and displays default head portraits of partner-players on the table to the player.

Seat assignation unit 22 assigns the player to an unoccupied seat in a random manner or by using an algorithm preset in the game server.

Assigning, by seat assignation unit 22, the player to an unoccupied seat in the random manner includes randomly assigning several players, who send join game commands, to an idle table, or randomly assigning a player, who sends the join game command, to an unoccupied seat of an idle table.

Assigning, by seat assignation unit 22, the player to an unoccupied seat by using the algorithm preset in the game server includes the following processes. Since different algorithms are generated according to different game properties and different algorithms are used according to different room properties, the game server can change algorithms and automatically assign several players sharing different IP addresses to one table in a game room that has a possibility that more players may cheat.

The game server has correctly read the actual information of the partner-players on the table when the player enters into the game room, and sends the actual information to partner-player information processing unit 33. The actual information of the partner-players may be any information capable of identifying the partner-players, such as IM numbers, nicknames, scores and levels, etc. Partner-player information processing unit 33 modifies the received actual information of the partner-players, and sends obtained dummy information of the partner-players to the terminal of the player, regardless of whether the player selects to start a game, wait for playing a game or leave a game.

Partner-player information processing unit 33 modifies the received actual information of the partner players to obtain the dummy information of the partner players by the following processes:

(a) Partner-player information processing unit 33 sends all the information of the partner-players to the terminal of the player, but all the information is invalid.

For example, when receiving information such as IM numbers, nicknames, scores and levels of the partner-players, partner-player information processing unit 33 modifies all or a part of information of all the players to default information. For instance, partner-player information processing unit 33 modifies all the game accounts to a same default account, such as 12345678 or gameplayers, modifies all the nicknames to "game player", modifies all the scores to zero, and modifies all the levels to zero. Then partner-player information processing unit 33 sends the obtained dummy information to the terminal of the player. As such, the player can not obtain the actual information of other players, thus can not recognize the players and contact with the players.

(b) Partner-player information processing unit 33 hides all the information of partner-players.

For example, partner-player information processing unit 33 deletes the actual information of all the partner-players, and does not send information to the terminal of the player. Then, the player only can obtain the number of the partner-players according to the number of the default head portraits.

(c) Partner-player information processing unit 33 hides a part of the information of the partner-players.

For example, partner-player information processing unit 33 deletes IM numbers of the partner-players, modifies all the nicknames of the partner-players to "game player", modifies all the scores to zero, modifies all the levels to zero, and sends the obtained dummy information to the terminal of the player.

In such a way, although the player can not obtain the information of the partner-players, can select to start, wait for playing a game or leave a game according to the number of the partner-players on one table.

By using the anti-cheating device provided by the embodiments of the present invention, the actual information of the table is modified without affecting the normal operation of the game server and the normal procedure of the game, and a player can join in a game on a table by using the device, thereby the cheat practiced by some players by seating on one table and directly knowing one another's cards is avoided. Additionally, since the watching information is modified, the cheat practiced by obtaining cards in the partner-players' hands is avoided. Also, since the actual information of the partner-players on the same table is modified, the action of some players on the same table obtaining one another's cards by using IM software, etc. and then deceiving other players is avoided.

It is apparent that those skilled in the art can make various modifications and variations without being apart from the sprit and scope of this invention. In such a way, if such modifications and variations are covered by the claims and the equivalent articles, this invention intends to contain these modifications and variations.

The invention claimed is:

1. A network game anti-cheating device, comprising:
an information processing unit, adapted to modify actual game state information to dummy game state information, and send the dummy game state information to a terminal of a player; and
a seat assignation unit, adapted to assign a player into an unoccupied seat of an idle table according to table information in a game room in the actual game state information;
wherein the dummy game state information comprises dummy table information in a game room, dummy game information of players who are playing a game on a table, and dummy information of partner-players on a table; and
the dummy game state information comprises any one of;
the dummy game state information formed by hiding all the actual game state information;
the dummy game state information formed by hiding a part of the actual game state information; and
the dummy game state information formed by making all the actual game state information invalid.

2. The device of claim 1, wherein
the information processing unit comprises:
a table information processing unit, adapted to send the dummy table information in the game room to the terminal of the player when the player enters into the game room;

a watching information processing unit, adapted to send the dummy game information of players who are playing the game on the table when the player sends a watch game command; and a partner-player information processing unit, adapted to send the dummy information of the partner-players on the table when the player sends a join game command;

wherein the dummy information of the partner-players comprises information for effectively identifying the partner-players.

3. The device of claim 1, wherein
the seat assignation unit is further adapted to assign the player to the unoccupied seat of the idle table in a random manner, or assign the player to the unoccupied seat of the idle table according to a preset algorithm.

4. The device of claim 1, wherein the dummy table information comprises at least one of: information indicating whether the table is idle and information indicating whether the idle table has an unoccupied seat.

5. A network game anti-cheating method, comprising:
modifying, by an anti-cheating device, actual game state information to dummy game state information;
sending, by the anti-cheating device, the dummy game state information to a terminal of a player; and
assigning, by the anti-cheating device, a player to an unoccupied seat of an idle table according to table information in a game room comprised in the actual game state information;
wherein the dummy game state information comprises dummy table information in a game room, dummy game information of players who are playing a game on a table, and dummy information of partner-players on a table; and
the dummy game state information comprises any one of;
the dummy game state information formed by hiding all the actual game state information;
the dummy game state information formed by hiding a part of the actual game state information; and
the dummy game state information formed by making all the actual game state information invalid.

6. The method of claim 5, wherein assigning by the anti-cheating device the player to the unoccupied seat of the idle table comprises:
assigning, by the anti-cheating device, the player to the unoccupied seat of the idle table in a random manner; or
assigning, by the anti-cheating device, the player to the unoccupied seat of the idle table according to a preset algorithm.

7. The method of claim 6, wherein assigning by the anti-cheating device the player to the unoccupied seat of the idle table in the random manner comprises:
assigning, by the anti-cheating device, several players to unoccupied seats of the idle table in one time, or assigning, by the anti-cheating device, one player into the unoccupied seat of the idle table in one time.

8. The method of claim 5, wherein the dummy table information comprises at least one of: information indicating whether the table is idle and information indicating whether the idle table has an unoccupied seat.

9. The method of claim 5, wherein the dummy information of the partner-players comprises: information for effectively identifying the partner-players.

10. A network game anti-cheating system, comprising:
a terminal of a player, a game server and an anti-cheating device arranged between the terminal of the player and the game server, wherein
the game server is adapted to provide actual game state information to the anti-cheating device;
the anti-cheating device is adapted to modify the actual game state information to dummy game state information, send the dummy game state information to the terminal of the player, and assign the player to an unoccupied seat of an idle table according to table information in a game room comprised in the actual game state information; and
the player terminal is adapted to receive the dummy game state information,
wherein the dummy game state information comprises dummy table information in a game room, dummy game information of players who are playing a game on a table, and dummy information of partner-players on a table; and
the dummy game state information comprises any one of;
the dummy game state information formed by hiding all the actual game state information;
the dummy game state information formed by hiding a part of the actual game state information; and
the dummy game state information formed by making all the actual game state information invalid.

* * * * *